(12) United States Patent
Hoshina

(10) Patent No.: US 12,103,629 B2
(45) Date of Patent: Oct. 1, 2024

(54) VEHICLE PROJECTION CONTROL DEVICE, VEHICLE PROJECTION SYSTEM, VEHICLE PROJECTION CONTROL METHOD, AND COMPUTER-READABLE STORAGE MEDIUM

(71) Applicant: JVCKENWOOD Corporation, Yokohama (JP)

(72) Inventor: Mana Hoshina, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 119 days.

(21) Appl. No.: 17/891,169

(22) Filed: Aug. 19, 2022

(65) Prior Publication Data

US 2022/0388590 A1 Dec. 8, 2022

Related U.S. Application Data

(63) Continuation of application No. PCT/JP2020/040382, filed on Oct. 28, 2020.

(30) Foreign Application Priority Data

Feb. 27, 2020 (JP) .................................. 2020-031147

(51) Int. Cl.
*B62J 6/26* (2020.01)
*B62J 6/057* (2020.01)
(Continued)

(52) U.S. Cl.
CPC ............... *B62J 6/26* (2020.02); *B62J 6/057* (2020.02); *B62J 45/20* (2020.02); *B62J 45/414* (2020.02); *B62J 50/25* (2020.02)

(58) Field of Classification Search
CPC ..... B62J 6/26; B62J 6/057; B62J 45/20; B62J 45/414; B62J 50/25; B62J 45/41;
(Continued)

(56) References Cited

U.S. PATENT DOCUMENTS 8,686,922 B2 * 4/2014 Breed ..................... G01S 17/88
701/1
9,656,602 B2 * 5/2017 Needham .................. B62J 6/04
(Continued)

FOREIGN PATENT DOCUMENTS

JP 2014-013524 1/2014
JP 2016-090318 5/2016
(Continued)

OTHER PUBLICATIONS

International Search Report and Written Opinion for International Application No. PCT/JP2020/040382 mailed on Dec. 28, 2020, 10 pages.

*Primary Examiner* — Eric Blount
(74) *Attorney, Agent, or Firm* — Amin, Turocy & Watson, LLP

(57) ABSTRACT

A vehicle projection control device includes: an occupant detection unit configured to detect an occupant on a vehicle; a traveling information acquisition unit configured to acquire traveling information of the vehicle and information indicating that the vehicle is traveling; a projection control unit configured to, when the occupant detection unit has detected the occupant and the traveling information acquisition unit has acquired the information indicating that the vehicle is traveling, cause a projection unit to project the acquired traveling information, the projection unit being configured to project a video in a direction corresponding to a body of the occupant on the vehicle; and a head detection unit configured to detect a head of the occupant on the vehicle in a projection direction of the projection unit. The projection control unit is configured to change a projection location of the acquired traveling information based on a location of the detected head.

9 Claims, 10 Drawing Sheets

(51) Int. Cl.
  *B62J 45/20* (2020.01)
  *B62J 45/414* (2020.01)
  *B62J 50/25* (2020.01)

(58) Field of Classification Search
  CPC . B62J 45/415; B60Q 1/26; B60Q 1/34; B60Q 1/44; F21V 9/40; G08G 1/16
  USPC ........................................................ 340/432
  See application file for complete search history.

(56) References Cited

U.S. PATENT DOCUMENTS

| | | | | |
|---|---|---|---|---|
| 10,239,445 | B1* | 3/2019 | Hendricks | H04N 9/3141 |
| 10,882,398 | B2* | 1/2021 | Cordell | G06V 20/597 |
| 2009/0058678 | A1* | 3/2009 | Matsuoka | B60R 1/00 |
| | | | | 340/904 |
| 2009/0237803 | A1* | 9/2009 | Hotta | G02B 3/005 |
| | | | | 359/630 |
| 2011/0075403 | A1* | 3/2011 | Niezrecki | B62J 6/015 |
| | | | | 362/183 |
| 2012/0169591 | A1* | 7/2012 | Moriya | B60K 35/00 |
| | | | | 345/156 |
| 2013/0194110 | A1* | 8/2013 | Kim | G06V 40/165 |
| | | | | 340/905 |
| 2016/0117554 | A1* | 4/2016 | Kang | H04N 23/74 |
| | | | | 348/78 |
| 2017/0088208 | A1* | 3/2017 | Ogawa | B62J 6/24 |
| 2019/0126821 | A1* | 5/2019 | Ho | G06V 20/582 |
| 2019/0318181 | A1* | 10/2019 | Katz | G06F 3/012 |
| 2020/0018952 | A1* | 1/2020 | Lewis | B60K 35/28 |
| 2020/0067786 | A1* | 2/2020 | Ricci | G06F 3/017 |
| 2020/0269943 | A1* | 8/2020 | Mulvaney | B62J 6/027 |

FOREIGN PATENT DOCUMENTS

| | | |
|---|---|---|
| JP | 2017-061221 | 3/2017 |
| WO | 2018/122887 | 7/2018 |

\* cited by examiner

VEHICLE PROJECTION CONTROL DEVICE, VEHICLE PROJECTION SYSTEM, VEHICLE PROJECTION CONTROL METHOD, AND COMPUTER-READABLE STORAGE MEDIUM

CROSS-REFERENCE TO RELATED APPLICATIONS

This application is a Continuation of PCT International Application No. PCT/JP2020/040382 filed on Oct. 28, 2020 which claims the benefit of priority from Japanese Patent Application No. 2020-031147 filed on Feb. 27, 2020, the entire contents of both of which are incorporated herein by reference.

BACKGROUND

The present disclosure relates to a vehicle projection control device, a vehicle projection system, a vehicle projection control method, and a computer-readable storage medium.

A technology for projecting information acquired by a mobile terminal carried by a user of a bicycle or the like onto the road surface has been known (for example, see Japanese Patent Application Laid-open No. 2016-090318).

According to the technology disclosed in Japanese Patent Application Laid-open No. 2016-090318, because information is projected on the road surface, it is difficult to check the information from a location away from the bicycle or the like. Even when the information is checked from the vicinity of the bicycle or the like, it may be difficult to check the information at a location crowded with other pedestrians and bicycles.

SUMMARY

A vehicle projection control device according to an embodiment includes: an occupant detection unit configured to detect an occupant on a vehicle; a traveling information acquisition unit configured to acquire traveling information of the vehicle and information indicating that the vehicle is traveling; a projection control unit configured to, when the occupant detection unit has detected the occupant and the traveling information acquisition unit has acquired the information indicating that the vehicle is traveling, cause a projection unit to project the traveling information acquired by the traveling information acquisition unit, the projection unit being configured to project a video in a direction corresponding to a body of the occupant on the vehicle; and a head detection unit configured to detect a head of the occupant on the vehicle in a projection direction of the projection unit. The projection control unit is configured to change a projection location of the traveling information acquired by the traveling information acquisition unit, based on a location of the head detected by the head detection unit.

A vehicle projection system according to an embodiment includes: the vehicle projection control device descried above; and the projection unit.

A vehicle projection control method according to an embodiment includes: detecting an occupant on a vehicle; acquiring traveling information of the vehicle and information indicating that the vehicle is traveling; causing, when the occupant has been detected and the information indicating that the vehicle is traveling has been acquired, a projection unit to project the acquired traveling information, the projection unit being configured to project a video in a direction corresponding to a body of the occupant on the vehicle; and detecting a head of the occupant on the vehicle in a projection direction of the projection unit. Causing the projection unit to project the acquired traveling information includes changing a projection location of the acquired traveling information based on a location of the detected head.

A non-transitory computer-readable storage medium according to an embodiment stores a computer program causing a computer to execute: detecting an occupant on a vehicle; acquiring traveling information of the vehicle and information indicating that the vehicle is traveling; causing, when the occupant has been detected and the information indicating that the vehicle is traveling has been acquired, a projection unit to project the acquired traveling information, the projection unit being configured to project a video in a direction corresponding to a body of the occupant on the vehicle; and detecting a head of the occupant on the vehicle in a projection direction of the projection unit. Causing the projection unit to project the acquired traveling information includes changing a projection location of the acquired traveling information based on a location of the detected head.

DETAILED DESCRIPTION

Hereinafter, embodiments of a vehicle projection control device, a vehicle projection system, a vehicle projection control method, and a computer-readable storage medium according to the present disclosure will be described in detail with reference to the accompanying drawings. It is to be noted that the present disclosure is not limited by the following embodiments.

First Embodiment

Vehicle Projection System

Figure 1:
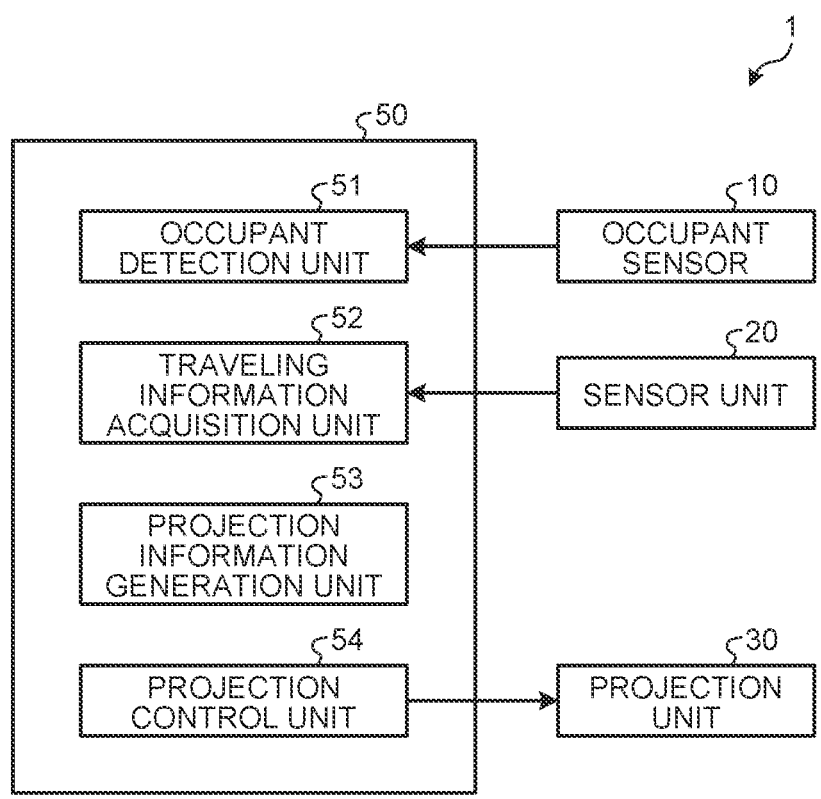
FIG. 1 is a block diagram illustrating an example of configuration of a vehicle projection system according to a first embodiment.

FIG. 1 is a block diagram illustrating an example of configuration of a vehicle projection system 1 according to a first embodiment. When an occupant is detected on a vehicle, the vehicle projection system 1 projects traveling information of the vehicle in a direction corresponding to the body of the occupant on the vehicle.

The vehicle includes a two-wheeled vehicle such as a bicycle and a motorcycle, and a kick scooter, for example. The vehicle includes what is called a personal mobility device, for example, that has a smaller body in the width and front-back directions than a four-wheeled vehicle such as an automobile. The vehicle may be powered or unpowered.

The traveling information of the vehicle is information indicating the traveling state of the vehicle. The traveling information of the vehicle is information that preferably is notified to a third party around the vehicle, to ensure safety of the occupant on the vehicle and the third party around the vehicle. For example, the traveling information of the vehicle is information indicating that the vehicle is traveling, information indicating that the vehicle stops or is reducing speed, information indicating that the vehicle is changing direction, and the like.

The direction corresponding to the body of the occupant on the vehicle indicates a direction toward the body of the occupant, a part of the vehicle, a luggage carrier towed by the vehicle, or the like, instead of a direction toward the road surface or the like outside the vehicle and the occupant.

The vehicle projection system 1 includes an occupant sensor 10, a sensor unit 20, a projection unit 30, and a vehicle projection control device 50.

The occupant sensor 10 is a sensor that detects data capable of determining whether an occupant is on the vehicle. The occupant sensor 10 is disposed on a seat of a portion of the vehicle on which the occupant sits such as a bicycle saddle, on the floor surface of a vehicle such as a kick scooter deck, for example. The occupant sensor 10 outputs occupant sensor data to an occupant detection unit 51 of the vehicle projection control device 50.

More specifically, the occupant sensor 10 is a sensor that detects whether an occupant is seated on the seat. For example, the occupant sensor 10 is a pressure sensor, a contact sensor, or the like that detects the force applied on the seat. When an occupant is seated on the driver's seat, the occupant sensor 10 detects a higher pressure than when an occupant is not seated on the seat.

The occupant sensor 10 is a sensor that detects whether an occupant is present on the floor surface. For example, the occupant sensor 10 is a pressure sensor, a contact sensor, or the like that detects the force applied on the floor surface. When an occupant is present on the floor surface, the occupant sensor 10 detects a higher pressure than when an occupant is not present on the floor surface.

The occupant sensor 10 may be a camera that captures an image of a range including an area around the seat of the vehicle. In this case, the captured video data is the passenger sensor data. Moreover, it is also possible to detect whether an occupant is sitting on the seat, from the captured video data.

The occupant sensor 10 may be a camera that captures an image of a range including an area around the floor surface of the vehicle. In this case, the captured video data is the passenger sensor data. Moreover, it is also possible to detect whether an occupant is present on the floor surface, from the captured video data.

The sensor unit 20 includes various sensors that detect various types of traveling information of the vehicle. For example, the sensor unit 20 is a sensor that detects information indicating whether the vehicle is traveling. For example, the sensor unit 20 is a sensor that detects information indicating that the vehicle stops or is reducing speed. For example, the sensor unit 20 is a sensor that detects information indicating that the vehicle is changing direction. The sensor unit 20 is a sensor that detects the operation amount of each unit of the vehicle, and an acceleration sensor, a gyro sensor, or the like that detects the behavior of the vehicle. More specifically, for example, the sensor unit 20 is a sensor that detects the rotation of the wheels; a sensor that detects the rotation of the motor for driving the vehicle; a sensor that detects the operation amount of a speed sensor, an acceleration sensor, and a steering wheel; a sensor that detects whether the direction indicator is operated; a sensor that can detect the amount of braking operation; an acceleration sensor; a gyro sensor; and the like. For example, the sensor unit 20 may include a Global Positioning System (GPS) receiver unit that acquires position information of the vehicle.

The projection unit 30 is disposed so as to be able to project information in the direction corresponding to the body of the occupant on the vehicle. The projection unit 30 is installed on the vehicle. The projection unit 30 is disposed so as to be able to project information toward the position that is the back of the occupant when the occupant is on the vehicle. For example, the projection unit 30 is a projector using liquid crystals or a projector using a laser light source. The projection unit 30 projects video indicating information on the basis of a video signal output from a projection control unit 54 of the vehicle projection control device 50. In the present embodiment, the direction corresponding to the body of the occupant on the vehicle is the direction toward the back of the occupant. When the projection unit 30 is disposed on the rear part of the vehicle, the projection unit 30 projects video toward the front. In the present disclosure, the projection may also be referred to as incidence of light.

Figure 2:
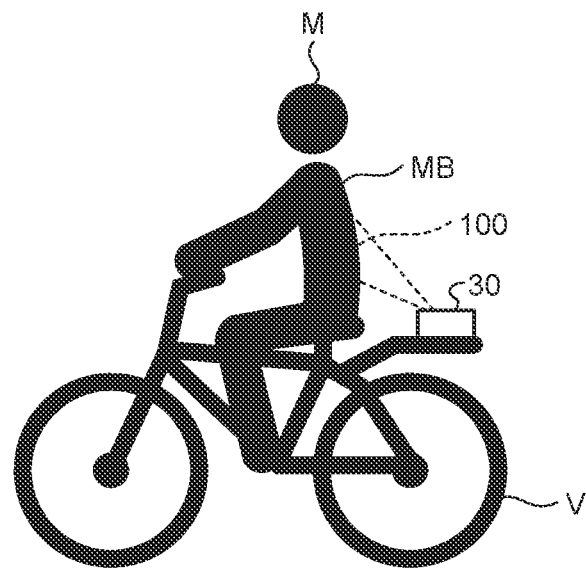
FIG. 2 is a schematic diagram for explaining an example of a projection unit of the vehicle projection system according to the first embodiment.

FIG. 2 is a schematic diagram for explaining an example of the projection unit 30 of the vehicle projection system 1 according to the first embodiment. FIG. 2 is an example of installing the projection unit 30, when a vehicle V is a two-wheeled vehicle. In FIG. 2, the projection unit 30 is installed on the luggage carrier of the vehicle V to face a back MB of an occupant M. The projection unit 30 can project video 100 toward the back of the occupant.

Figure 3:
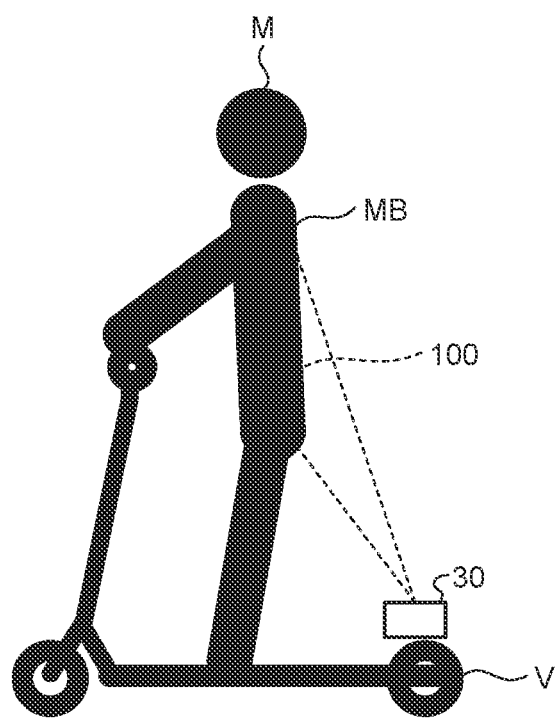
FIG. 3 is a schematic diagram for explaining another example of the projection unit of the vehicle projection system according to the first embodiment.

FIG. 3 is a schematic diagram for explaining another example of the projection unit 30 of the vehicle projection system 1 according to the first embodiment. FIG. 3 is an example of installing the projection unit 30, when the vehicle V is a kick scooter. In FIG. 3, the projection unit 30 is installed on the rear part of the floor board of the vehicle V to face the back MB of the occupant M. The projection unit 30 can project the video 100 toward the back MB of the occupant M.

Returning to FIG. 1, for example, the vehicle projection control device 50 is an arithmetic processing device formed by a Central Processing Unit (CPU) and the like. The vehicle projection control device 50 loads a computer program stored in a storage unit, which is not illustrated, into memory, and executes the instructions contained in the computer program. The vehicle projection control device 50 includes the occupant detection unit 51, a traveling information acquisition unit 52, a projection information generation unit 53, and the projection control unit 54. The vehicle projection control device 50 includes an internal memory, which is not illustrated. The internal memory is used for temporary storing data in the vehicle projection control device 50. In the present embodiment, the vehicle projection control device 50 is set on a vehicle. However, the vehicle projection control device 50 may also be portable.

The occupant detection unit 51 detects an occupant on the vehicle, on the basis of the occupant sensor data detected by the occupant sensor 10. For example, the occupant detection unit 51 detects an occupant on the vehicle, when the occupant sensor data indicates that the occupant is seated on the seat of the vehicle. For example, the occupant detection unit 51 detects an occupant on the vehicle, when the occupant sensor data indicates that the occupant is present on the floor surface. The occupant detection unit 51 outputs the detection result to the projection information generation unit 53 and the projection control unit 54 of the vehicle projection control device 50.

The traveling information acquisition unit 52 acquires traveling information of the vehicle, on the basis of the sensor data acquired from the sensor unit 20.

For example, the traveling information acquisition unit 52 acquires information indicating that the vehicle is traveling, from the sensor data. More specifically, for example, the traveling information acquisition unit 52 acquires information indicating that the vehicle is traveling, on the basis of the output from a sensor that detects the rotation of the wheels, a sensor that detects the rotation of the motor for driving the vehicle, a sensor that detects the operation amount of a speed sensor, an acceleration sensor, and a steering wheel, a GPS receiver unit, and the like, in the sensor unit 20. The vehicle is traveling, if the output from the sensors described above is not zero, or if the value is changing.

For example, the traveling information acquisition unit 52 acquires information indicating that the vehicle stops or is reducing speed from the sensor data, as the traveling information of the vehicle. More specifically, for example, the traveling information acquisition unit 52 acquires information indicating that the vehicle is stops or is reducing speed, as information indicating the behavior of the vehicle acquired on the basis of the braking operation of the vehicle, or the output from the acceleration sensor and the gyro sensor, in the sensor unit 20. The vehicle stops or is reducing speed, if the amount of braking operation of the vehicle indicates that a braking operation is performed, or if the output from the acceleration sensor or the gyro sensor indicates that the vehicle is reducing speed.

For example, the traveling information acquisition unit 52 acquires information indicating that the vehicle is changing direction from the sensor data, as the traveling information of the vehicle. More specifically, for example, the traveling information acquisition unit 52 acquires information indicating that the vehicle is changing direction, on the basis of the sensor that detects the operation of the direction indicator, or the output from the acceleration sensor and the gyro sensor of the vehicle, in the sensor unit 20. The vehicle is changing direction, when the direction indicator of the vehicle is operated. The vehicle is changing direction, when the output from the acceleration sensor and the gyro sensor has a predetermined inclination.

The projection information generation unit 53 generates video data to be projected, from the detection result of the occupant detection unit 51 and the traveling information acquired by the traveling information acquisition unit 52. When the occupant detection unit 51 has detected an occupant, the projection information generation unit 53 generates video data that projects the traveling information acquired by the traveling information acquisition unit 52. The projection information generation unit 53 generates video data that can be easily viewed by a third party around the vehicle. The projection information generation unit 53 outputs the generated video data to the projection control unit 54.

For example, the projection information generation unit 53 generates video data for projection in which an arrow appears to be moving, stored in the storage unit, which is not illustrated, as information indicating that the vehicle is traveling. For example, the projection information generation unit 53 may also generate video data of text, which is a brief message, or video data of an image, indicating that the vehicle is traveling.

For example, the projection information generation unit 53 generates video data for projection in which an arrow is stopped moving, stored in the storage unit, which is not illustrated, as information indicating that the vehicle stops or is reducing speed. For example, the projection information generation unit 53 may also generate video data of text, which is a brief message, or video data of an image, indicating that the vehicle stops or is reducing speed.

For example, the projection information generation unit 53 generates video data for projection in which an arrow is indicating the direction toward which the vehicle is changing its course, stored in the storage unit, which is not illustrated, as information indicating that the vehicle is changing direction. For example, the projection information generation unit 53 may also generate video data of text, which is a brief message, or video data of an image indicating that the vehicle is changing direction.

Figure 4:
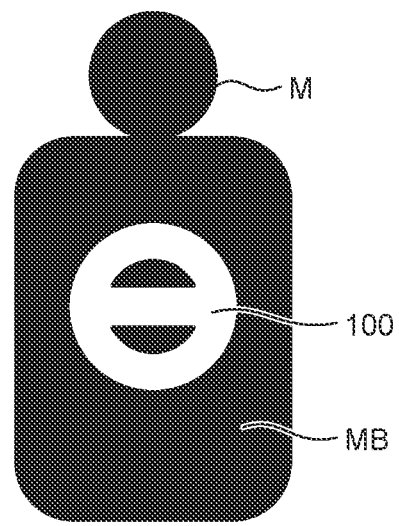
FIG. 4 is a schematic diagram illustrating an example of video projected by the projection unit.

FIG. 4 is a schematic diagram illustrating an example of video projected by the projection unit 30. FIG. 4 is an example of video data of an image indicating that the vehicle stops.

Figure 5:
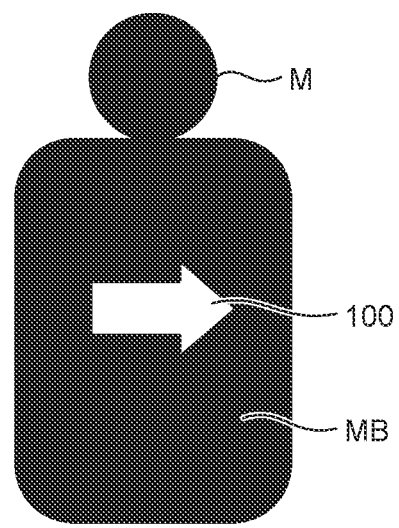
FIG. 5 is a schematic diagram illustrating another example of video projected by the projection unit.

FIG. 5 is a schematic diagram illustrating another example of video projected by the projection unit 30. FIG. 5 is an example of video data of an image indicating the course of the vehicle after changing the direction.

The projection control unit 54 causes the projection unit 30 to project the video data generated by the projection information generation unit 53. When the occupant detection unit 51 has detected an occupant, the projection control unit 54 projects the traveling information acquired by the traveling information acquisition unit 52 in the direction corresponding to the body of the occupant on the vehicle, via the projection unit 30. In other words, the projection control unit 54 projects the traveling information toward the back of the occupant, while the occupant is on the vehicle.

While the occupant detection unit 51 is detecting an occupant and the traveling information acquisition unit 52 is acquiring information indicating that the vehicle is traveling, the projection control unit 54 may also project the traveling information acquired by the traveling information acquisition unit 52 in the direction corresponding to the body of the occupant on the vehicle, via the projection unit 30. In other words, while the occupant is on the vehicle and the vehicle is traveling, the projection control unit 54 may project the traveling information toward the back of the occupant.

When the traveling information acquisition unit 52 acquires information indicating that the vehicle stops or is reducing speed, the projection control unit 54 may project video indicating that the vehicle stops or is reducing speed in the direction corresponding to the body of the occupant on the vehicle, via the projection unit 30. In other words, while an operation to stop the vehicle or reduce speed of the vehicle is taking place, that is, while the vehicle is reducing speed, the projection control unit 54 may project video indicating that the vehicle stops or is reducing speed, toward the back of the occupant.

When the traveling information acquisition unit 52 acquires information indicating that the vehicle is changing direction, the projection control unit 54 may project video indicating the changing direction in the direction corresponding to the body of the occupant on the vehicle. In other words, the projection control unit 54 may project video indicating that the vehicle stops or is reducing speed, from when the output of the acceleration sensor or the gyro sensor starts indicating a certain acceleration or inclination, while the output indicates the certain acceleration or inclination, that is, while the vehicle is changing direction.

Processing in Vehicle Projection System

Figure 6:
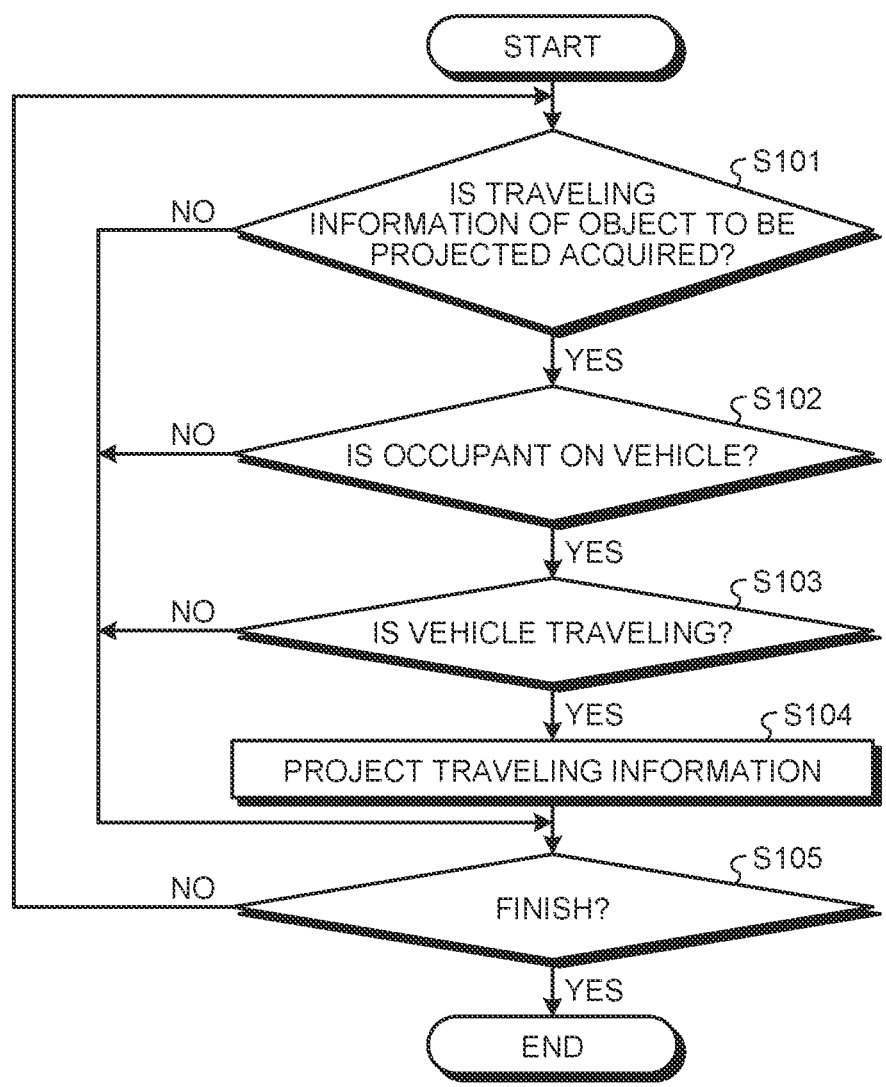
FIG. 6 is a flowchart illustrating a flow of processing in the vehicle projection system according to the first embodiment.

Next, a flow of processing in the vehicle projection control device 50 of the vehicle projection system 1 will be described with reference to FIG. 6. FIG. 6 is a flowchart illustrating a flow of processing in the vehicle projection system 1 according to the first embodiment.

While the vehicle projection system 1 is activated, the occupant sensor 10 continuously detects an occupant on the vehicle, and outputs the occupant sensor data to the occupant detection unit 51 of the vehicle projection control device 50. Moreover, while the vehicle projection system 1 is activated, the sensor unit 20 continuously detects the traveling state of the vehicle, and outputs the detected sensor data to the traveling information acquisition unit 52 of the vehicle projection control device 50. While the vehicle projection system 1 is activated, the vehicle projection control device 50 repeatedly executes the process from step S101 to step S105.

The vehicle projection control device 50 determines whether the traveling information acquisition unit 52 has acquired the traveling information of the vehicle of an object to be projected (step S101). If it is determined that the traveling information acquisition unit 52 has acquired the traveling information of the vehicle of the object to be projected (Yes at step S101), the process proceeds to step S102. If it is determined that the traveling information acquisition unit 52 has not acquired the traveling information of the vehicle of the object to be projected (No at step S101), the process proceeds to step S105.

If it is determined that the traveling information acquisition unit 52 has acquired the traveling information of the vehicle of the object to be projected (Yes at step S101), the vehicle projection control device 50 determines whether an occupant is on the vehicle (step S102). More specifically, if the occupant detection unit 51 detects an occupant on the vehicle on the basis of the occupant sensor data (Yes at step S102), the process proceeds to step S103. If the occupant detection unit 51 does not detect an occupant on the vehicle on the basis of the occupant sensor data (No at step S102), the process proceeds to step S105.

If the occupant detection unit 51 detects an occupant on the vehicle (Yes at step S102), the vehicle projection control device 50 determines whether the vehicle is traveling (step S103). More specifically, if the traveling information acquisition unit 52 indicates that the vehicle is traveling on the basis of the sensor data (Yes at step S103), the process proceeds to step S104. If the traveling information acquisition unit 52 indicates that the vehicle is not traveling on the basis of the sensor data (No at step S103), the process proceeds to step S105.

If the traveling information acquisition unit 52 indicates that the vehicle is traveling (Yes at step S103), the vehicle projection control device 50 projects the traveling information (step S104). More specifically, the projection information generation unit 53 generates video data for projection indicating the traveling information. The projection control unit 54 projects the generated video data for projection toward the direction of the body of the occupant on the vehicle, via the projection unit 30. The vehicle projection control device 50 proceeds the process to step S105. The order of the processes from step S101 to step S103 may be changed.

The vehicle projection control device 50 determines whether to finish the projection (step S105). For example, the vehicle projection control device 50 determines to stop the projection on the basis of the traveling information of the vehicle acquired by the traveling information acquisition unit 52. The vehicle projection control device 50 determines to finish the projection, if the projection is started on the basis of information indicating that the vehicle stops or is reducing speed, when acquisition of the information indicating that the vehicle stops or is reducing speed is finished; when the vehicle stops; when a predetermined period of time has passed since the vehicle has stopped; or when the detection result of the occupant detection unit 51 indicates that the occupant has alighted from the vehicle. The vehicle projection control device 50 determines to finish the projection, if the projection is started on the basis of information indicating that the vehicle is changing direction, when acquisition of the information indicating that the vehicle is changing direction is finished; or when a predetermined period of time has passed since the acquisition of information indicating that the vehicle is changing direction is finished. If the vehicle projection control device 50 determines to finish the projection (Yes at step S105), the process will be finished. If the vehicle projection control device 50 determines not to finish the projection (No at step S105), the process at step S101 will be executed again.

Effects

As described above, in the present embodiment, for example, when an occupant is detected on the vehicle, video indicating the traveling information of the vehicle is projected in the direction corresponding to the body of the occupant on the vehicle, such as in the direction of the back of the occupant on the vehicle. According to the present embodiment, the traveling information of the vehicle can be projected on a part of body such as the back of the occupant, a part of vehicle, or the like above the road surface. According to the present embodiment, a third party around the vehicle can recognize the traveling information of the vehicle, even from a location away from the vehicle. According to the present embodiment, a third party around the vehicle can recognize the travel information of the vehicle, even when the location is crowded with other pedestrians, bicycles, and the like. Thus, according to the present embodiment, it is possible to appropriately notify the third party around the vehicle of the information.

In the present embodiment, while an occupant is detected on the vehicle and information indicating that the vehicle is traveling is acquired, the traveling information of the vehicle is projected in the direction corresponding to the body of the occupant on the vehicle. According to the present embodiment, it is possible to more appropriately notify the third party around the vehicle of the traveling information of the vehicle. The present embodiment can prevent unnecessary information from being projected, when the vehicle has stopped, even if an occupant is on the vehicle. Moreover, the present embodiment can prevent information from being projected accidentally, when an occupant is not on the vehicle.

In the present embodiment, when the information indicating that the vehicle stops or is reducing speed is acquired, video indicating that the vehicle stops or is reducing speed is projected in the direction corresponding to the body of the occupant on the vehicle. According to the present embodiment, it is possible to appropriately notify the third party around the vehicle that the vehicle stops or is reducing speed. The present embodiment can improve the safety of the occupant on the vehicle and the third party around the vehicle.

In the present embodiment, the information indicating that the vehicle stops or is reducing speed is acquired on the basis of the braking operation of the vehicle, or the output from the acceleration sensor and the gyro sensor of the vehicle, in the sensor unit 20. According to the present embodiment, it is possible to project accurate information, on the basis of accurate information indicating that the vehicle stops or is reducing speed.

In the present embodiment, the video indicating the changing direction is projected in the direction corresponding to the body of the occupant on the vehicle, when the information indicating that the vehicle is changing direction is acquired. According to the present embodiment, it is possible to appropriately notify the third party around the vehicle that the vehicle is changing direction. The present embodiment can improve the safety of the occupant on the vehicle and the third party around the vehicle.

In the present embodiment, the information indicating that the vehicle is changing direction is acquired on the basis of the output from the acceleration sensor, the gyro sensor, or the like of the vehicle, in the sensor unit 20. According to the present embodiment, it is possible to project accurate information, on the basis of accurate information indicating that the vehicle is changing direction.

Second Embodiment

Figure 7:
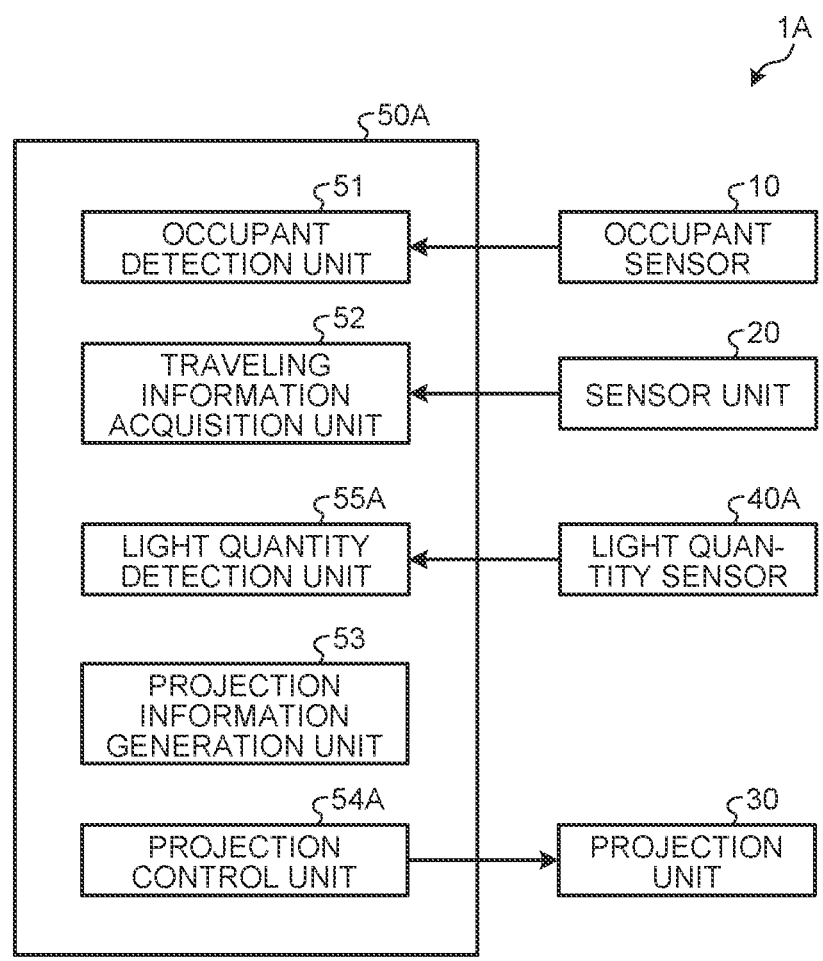
FIG. 7 is a block diagram illustrating an example configuration of a vehicle projection system according to a second embodiment.
Figure 8:
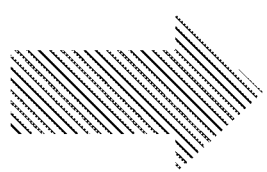
FIG. 8 is a schematic diagram illustrating an example of video projected by the projection unit.
Figure 9:
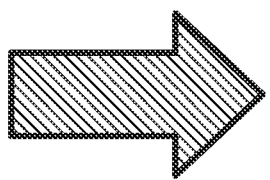
FIG. 9 is a schematic diagram illustrating another example of video projected by the projection unit.

A vehicle projection system 1A according to the present embodiment will be described with reference to FIG. 7 to FIG. 9. FIG. 7 is a block diagram illustrating an example of configuration of the vehicle projection system 1A according to a second embodiment. FIG. 8 is a schematic diagram illustrating an example of video projected by the projection unit 30. FIG. 9 is a schematic diagram illustrating another example of video projected by the projection unit 30. The basic configuration of the vehicle projection system 1A is the same as that of the vehicle projection system 1 of the first embodiment. In the following description, the same reference numerals or the corresponding reference numerals denote the components similar to those of the vehicle projection system 1 of the first embodiment, and the detailed descriptions thereof will be omitted. The present embodiment is different from the first embodiment in including a light quantity sensor 40A, in that a vehicle projection control device 50A includes a light quantity detection unit 55A, and in the processing in a projection control unit 54A of the vehicle projection control device 50A.

The light quantity sensor 40A is a sensor disposed on the vehicle, and that acquires the light quantity around the vehicle. The light quantity sensor 40A outputs the measured light quantity sensor data to the light quantity detection unit 55A.

The light quantity detection unit 55A detects the light quantity around the vehicle. The light quantity detection unit 55A acquires light quantity sensor data indicating the light quantity around the vehicle, from the light quantity sensor 40A. The light quantity detection unit 55A outputs the light quantity detection result to the projection control unit 54A.

The projection control unit 54A projects video data by changing the projection mode of the video data, according to the light quantity around the vehicle detected by the light quantity detection unit 55A. More specifically, if the light quantity detected by the light quantity detection unit 55A indicates that an area around the vehicle is bright, the projection control unit 54A projects video data by changing the projection mode of the video data to be projected.

For example, an area around the vehicle is bright, when the brightness is similar to that from sunrise to sunset. For example, an area around the vehicle is bright, when it is bright enough to drive an automobile without turning on the headlight. For example, an area around the vehicle is bright, when the area is illuminated by illumination light and the like even at night.

For example, when the area around the vehicle is bright, the projection control unit 54A projects the video data in a form in which the visibility is enhanced, by changing the colors, luminance, and brightness of the video data. For example, when the area around the vehicle is bright, the projection control unit 54A may also project the video data in a form in which the visibility is enhanced, by increasing the size of the video data. For example, when the area around the vehicle is bright, the projection control unit 54A may also project the video data in a form in which the visibility is enhanced, by surrounding the periphery of the video data with a line. The video data illustrated in FIG. 8 is a colored arrow image, and indicates a form of video data to be projected at night. The video data illustrated in FIG. 8 is not surrounded by a line. The video data illustrated in FIG. 9 is a colored arrow image the periphery of which is surrounded by a line, and indicates a form of video data to be projected during the daytime.

As described above, in the present embodiment, it is possible to project the traveling information when the area around the vehicle is bright, by changing the form of the information so as to increase the visibility, compared to when the area around the vehicle is dark. According to the present embodiment, it is possible to appropriately notify the third party around the vehicle of the information, even when the area around the vehicle is bright.

Third Embodiment

Figure 10:
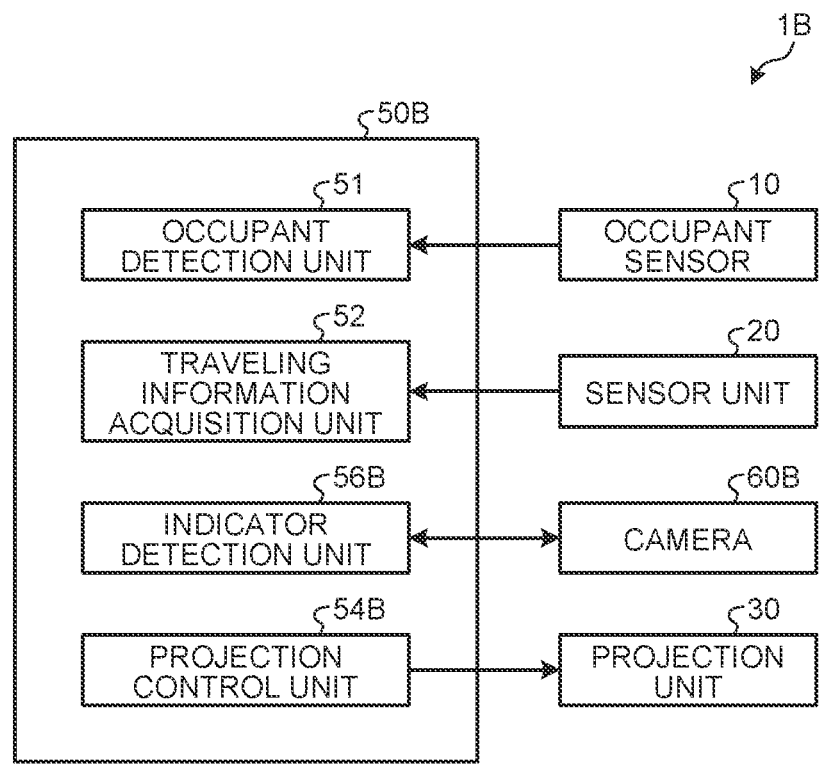
FIG. 10 is a block diagram illustrating an example of configuration of a vehicle projection system according to a third embodiment.
Figure 11:
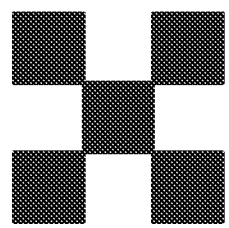
FIG. 11 is a schematic diagram illustrating an example of an indicator.
Figure 12:
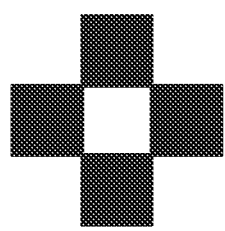
FIG. 12 is a schematic diagram illustrating another example of the indicator.
Figure 13:
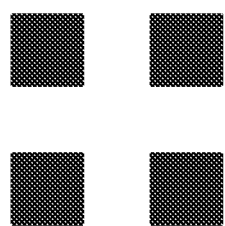
FIG. 13 is a schematic diagram illustrating another example of the indicator.
Figure 14:
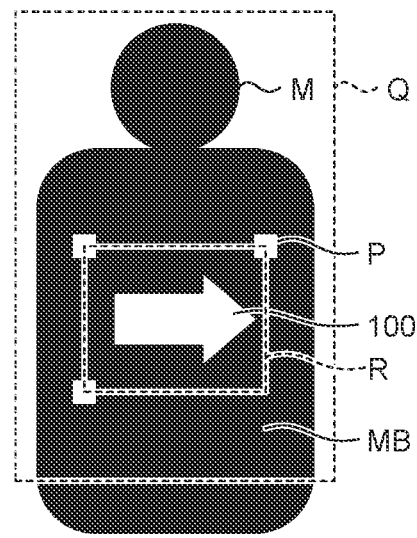
FIG. 14 is a schematic diagram illustrating an example of video projected by the projection unit.

A vehicle projection system 1B according to the present embodiment will be described with reference to FIG. 10 to FIG. 14. FIG. 10 is a block diagram illustrating an example of configuration of the vehicle projection system 1B according to a third embodiment. FIG. 11 is a schematic diagram illustrating an example of an indicator P. FIG. 12 is a schematic diagram illustrating another example of the indicator P. FIG. 13 is a schematic diagram illustrating another example of the indicator P. FIG. 14 is a schematic diagram illustrating an example of video projected by the projection unit 30. The present embodiment is different from the first embodiment in including a camera 60B, in that a vehicle projection control device 50B includes an indicator detection unit 56B, and in the processing in a projection control unit 54B of the vehicle projection control device 50B.

The camera 60B is disposed in the vicinity of the projection unit 30 so as to be able to capture an image in the projection direction of the projection unit 30. In other words, the camera 60B is disposed in the vicinity of the projection unit 30 so that a projection range R of the projection unit 30 is included in an imaging range Q. More specifically, the camera 60B is disposed so that the direction corresponding to the body of the occupant on the vehicle is included in the imaging range Q. The camera 60B outputs the captured imaging data to the indicator detection unit 56B.

The indicator detection unit 56B detects an indicator P indicating the projection range R in the projection direction of the projection unit 30. More specifically, when the occupant detection unit 51 detects an occupant on the vehicle, the indicator detection unit 56B detects the indicator P in the imaging range Q from the imaging data captured by the camera 60B.

The indicator P is a marker indicating the projection range R. The shape of the indicator P is determined in advance, and will not be mistaken for other patterns and the like. For example, the indicator P has a frame shape surrounding the projection range R, a graphics shape in which the projection range R is indicated in a planar shape, a dot shape that can specify the external form of the projection range R, and the like. For example, the dotted indicator P is attached at least at two to four locations, which are a predetermined number, to define the projection range R. For example, the indicators P at two locations indicate the diagonal of a rectangular range with a predetermined aspect ratio. For example, the indicators P at three or four locations indicate a rectangular range defined by those dots. The indicator P is not limited to a rectangular shape, and may be formed in any shape such as a polygonal shape, a circular shape, and an oval shape.

The indicator P will be described with reference to FIG. 11 to FIG. 13. FIG. 11 to FIG. 13 are examples of the dotted indicators P. For example, as illustrated in FIG. 11, the indicator P may be an image obtained by combining five rectangles. For example, as illustrated in FIG. 12, the indicator P may be an image obtained by arranging four rectangles on the four ends of a cross. For example, as illustrated in FIG. 13, the indicator P may be an image obtained by arranging four rectangles on the corners of a square. For example, the projection range R is defined by attaching such indicators P at least at two to four locations. In FIG. 14, the projection range R is defined by indicating the three corners of a rectangle by the three indicators P. The color of each indicator is optional. However, it is preferable that the color of the indicator be easily distinguished from the color of clothing worn by the occupant and the like. A reflective material may also be used.

For example, the indicator P may be attached to the clothing and helmet worn by the occupant, and may be removed by hook-and-loop fasteners, snap buttons, and the like. For example, the indicator P may be attached in advance to clothing such as an occupant vest, which is to be sold with the vehicle.

The indicator P defines the projection range R such that the shape and arrangement of which increase the visibility. The indicator P defines the projection range R such that the shape and arrangement of which are hardly deformed or hidden by the movement of the occupant.

The process of detecting the indicator P by the indicator detection unit 56B may also be performed by the occupant detection unit 51 that detects an occupant on the vehicle. This is because when the indicator P is detected by the indicator detection unit 56B in a range the angle of view of which is a predetermined size or more, within the imaging range Q defined by the imaging angle of view of the camera 60B, it means that an occupant is on the vehicle.

The projection control unit 54B projects the traveling information in the projection range R defined by the indicator P detected by the indicator detection unit 56B. In the present embodiment, the projection control unit 54B projects the traveling information in the projection range R defined by the indicator P, in the direction corresponding to the body of the occupant. As illustrated in FIG. 14, while the occupant M is on the vehicle, the projection control unit 54B projects the traveling information in the projection range R defined by the indicator P on the back MB of the occupant M.

As described above, in the present embodiment, the traveling information is projected in the range defined by the indicator P. According to the present embodiment, it is possible to project the traveling information in an appropriate range. According to the present embodiment, it is possible to more appropriately notify the third party around the vehicle of the information.

Fourth Embodiment

Figure 15:
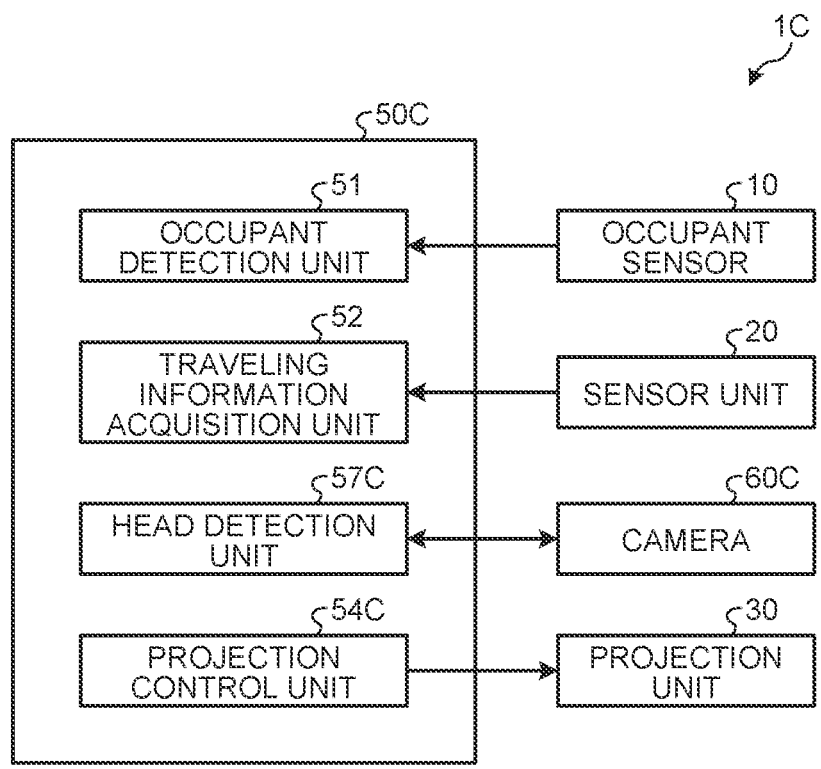
FIG. 15 is a block diagram illustrating an example of configuration of a vehicle projection system according to a fourth embodiment.
Figure 16:
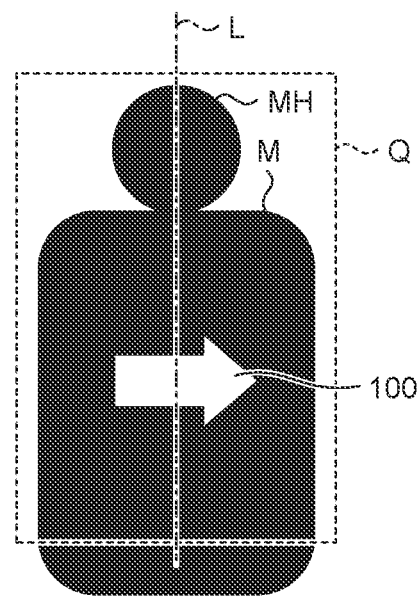
FIG. 16 is a schematic diagram illustrating an example of video projected by the projection unit.
Figure 17:
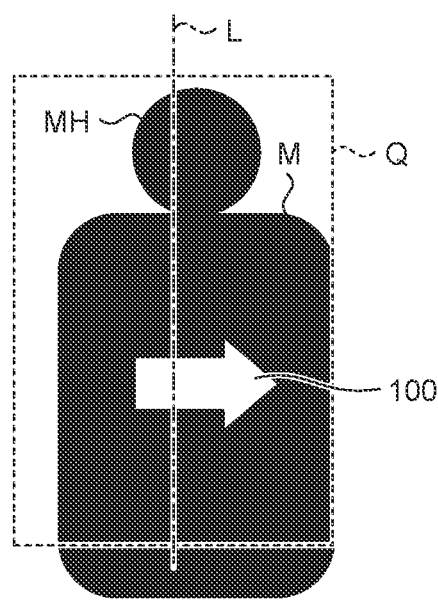
FIG. 17 is a schematic diagram illustrating another example of video projected by the projection unit.

A vehicle projection system 1C according to the present embodiment will be described with reference to FIG. 15 to FIG. 17. FIG. 15 is a block diagram illustrating an example of configuration of the vehicle projection system 1C according to a fourth embodiment. FIG. 16 is a schematic diagram illustrating an example of video projected by the projection unit 30. FIG. 17 is a schematic diagram illustrating another example of video projected by the projection unit 30. The present embodiment is different from the first embodiment in including a camera 60C, in that a vehicle projection control device 50C includes a head detection unit 57C, and in the processing in a projection control unit 54C of the vehicle projection control device 50C.

The camera 60C is disposed in the vicinity of the projection unit 30 so as to be able to capture an image in the projection direction of the projection unit 30. More specifically, the camera 60C is disposed so that the head of an occupant on the vehicle is included in the imaging range Q. The camera 60C outputs the captured imaging data to the head detection unit 57C.

The head detection unit 57C detects the head of an occupant on the vehicle in the projection direction of the projection unit 30. More specifically, when the occupant detection unit 51 detects an occupant on the vehicle, the head detection unit 57C detects the head of the occupant in the imaging range Q, from the imaging data captured by the camera 60C. For example, the head detection unit 57C may perform person recognition that detects a person in the captured imaging data, and specify the head of the recognized person. In this case, a recognition dictionary that has learned the video of the upper part of a person captured from the rear is used for the person recognition. When a helmet attached with the indicator P is detected from the imaging data captured by the camera 60C, the head detection unit 57C may detect the helmet as the head of the occupant.

As illustrated in FIG. 16, for example, if the occupant M is on the vehicle without inclining with respect to the vehicle, the head detection unit 57C detects a head MH of the occupant M near the center line L in the horizontal direction in the imaging range Q of the captured image.

As illustrated in FIG. 17, for example, if the occupant M is inclined in the horizontal direction with respect to the vehicle, or if the occupant M is not properly positioned on the vehicle, the head detection unit 57C detects the head MH of the occupant M at a location inclined in the horizontal direction from the center line L or at a shifted location, in the imaging range Q of the captured image.

The process of detecting the head of an occupant by the head detection unit 57C may also be performed by the occupant detection unit 51 that detects an occupant on the vehicle. This is because when the head of an occupant is detected by the head detection unit 57C in a range the angle of view of which is a predetermined size or more, within the imaging range Q defined by the imaging angle of view of the camera 60C, it means that an occupant is on the vehicle.

The projection control unit 54C changes the projection location of the traveling information acquired by the traveling information acquisition unit 52, on the basis of the location of the head detected by the head detection unit 57C.

For example, when the detection result of the head detection unit 57C indicates that the head of the occupant is detected near the center line L of the captured image in the horizontal direction, the projection control unit 54C projects the traveling information on the center part of the projection range R in the horizontal direction.

For example, when the detection result of the head detection unit 57C indicates that the head of the occupant is detected at a location inclined in the horizontal direction or at a shifted location in the captured image, the projection control unit 54C changes the projection location of the traveling information on the basis of the location where the head is detected. Specifically, the projection control unit 54C shifts the projection location of the traveling information in the projection range R to left and right, so as to correspond to the shifted location of the head.

As described above, in the present embodiment, the projection location of the traveling information is changed, on the basis of the location of the detected head. The present embodiment can prevent the projection light that projects the traveling information from being projected in the range other than the occupant, depending on the posture of the occupant. Moreover, the present embodiment can appropriately project the traveling information on a location where the occupant is present. According to the present embodiment, it is possible to more appropriately notify the third party around the vehicle of the information.

While the vehicle projection system 1 according to the present disclosure has been described above, various other modifications may be made in addition to the embodiments described above.

Each component of the vehicle projection system 1 illustrated in the drawings is functionally conceptual and may not necessary be physically configured as illustrated in the drawings. That is, the specific form of each device is not limited to that illustrated in the drawings, and all or part of the device may be functionally or physically separated or integrated in an optional unit according to the processing load, the status of use, or the like of each device.

For example, the configuration of the vehicle projection system 1 is implemented as software by a computer program loaded in a memory or the like. In the embodiments described above, functional blocks implemented by cooperation of hardware or software are depicted. That is, these functional blocks can be implemented in various forms by hardware only, software only, or a combination of hardware and software.

The components described above include components that can be easily assumed by those skilled in the art, and components that are substantially the same. Moreover, the components described above can be combined as appropriate. Furthermore, various omissions, substitutions, or changes may be made to the configuration without departing from the scope of the present disclosure.

In the above, for example, the projection control unit 54 may project video data by changing the colors of the video data so as to increase visibility, according to the color of the detected object to be projected, on the basis of the detection result of a target detection unit that detects the color of the object to be projected such as the color of clothing of the occupant. Consequently, it is possible to appropriately notify the third party around the vehicle of the information, regardless of the color of the object to be projected.

In the above, information is projected on the back of the occupant. However, it is not limited thereto. For example, information may also be projected on the abdomen of the occupant, the baggage carried by the occupant on his/her back, the baggage mounted on the luggage carrier, the helmet worn by the occupant, a box-shaped luggage carrier towed by a vehicle, and the like. To project information on the abdomen of the occupant, the projection unit 30 may be disposed on the front part of the vehicle, and the information may be projected in the direction corresponding to the body of the occupant, that is, toward the rear. To project information on the box-shaped luggage carrier towed by a vehicle, the projection unit 30 may be disposed on the rear part of the luggage carrier of the vehicle, and the information may be projected in the direction corresponding to the body of the occupant, that is, toward the front.

For example, the vehicle projection control device, the vehicle projection system, the vehicle projection control method, and the computer program of the present disclosure can be used for notifying people around the vehicle of information, in the vehicle such as a two-wheeled vehicle including a bicycle and a motorcycle, a kick scooter, and the like.

The computer program for performing the vehicle projection control method described above may be provided by being stored in a non-transitory computer-readable storage medium, or may be provided via a network such as the Internet. Examples of the computer-readable storage medium include optical discs such as a digital versatile disc (DVD) and a compact disc (CD), and other types of storage devices such as a hard disk and a semiconductor memory.

The present disclosure presents an effect of appropriately notifying people around the vehicle of information.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle projection control device, comprising:
    an occupant detection unit configured to detect an occupant on a vehicle;
    a traveling information acquisition unit configured to acquire traveling information of the vehicle and information indicating that the vehicle is traveling;
    a projection control unit configured to, when the occupant detection unit has detected the occupant and the traveling information acquisition unit has acquired the information indicating that the vehicle is traveling, cause a projection unit to project the traveling information acquired by the traveling information acquisition unit, the projection unit being configured to project a video in a direction towards a body of the occupant on the vehicle; and a head detection unit configured to detect a head of the occupant on the vehicle in a projection direction of the projection unit, wherein the projection control unit is configured to change a projection location of the traveling information acquired by the traveling information acquisition unit, based on a location of the head detected by the head detection unit.

2. The vehicle projection control device according to claim 1, wherein the head detection unit is configured to detect the head of the occupant on the vehicle from a captured image of the occupant on the vehicle, and the projection control unit is configured to, when the head detection unit detects the head of the occupant on the vehicle at a location inclined in a horizontal direction or at a shifted location, change the projection location of the traveling information acquired by the traveling information acquisition unit.

3. The vehicle projection control device according to claim 1, wherein the head detection unit is configured to detect that the head of the occupant on the vehicle is at a location inclined in a horizontal direction or at a shifted location with respect to a center line of an imaging range of a captured image of the occupant on the vehicle.

4. The vehicle projection control device according to claim 1, further comprising:

an indicator detection unit configured to detect an indicator indicating a projection range in a projection direction of the projection unit, wherein the projection control unit is configured to cause the projection unit to project the traveling information acquired by the traveling information acquisition unit in a range defined by the indicator detected by the indicator detection unit.

5. The vehicle projection control device according to claim 1, wherein the traveling information acquisition unit is configured to acquire information indicating that the vehicle stops or is reducing speed, as the traveling information of the vehicle, and the projection control unit is configured to, when the traveling information acquisition unit acquires the information indicating that the vehicle stops or is reducing speed, cause the projection unit to project video indicating that the vehicle stops or is reducing speed in the direction towards the body of the occupant on the vehicle.

6. The vehicle projection control device according to claim 1, wherein the traveling information acquisition unit is configured to acquire information indicating that the vehicle is changing direction, as the traveling information of the vehicle, and the projection control unit is configured to, when the traveling information acquisition unit acquires the information indicating that the vehicle is changing direction, cause the projection unit to project a video indicating a changing direction in the direction towards the body of the occupant on the vehicle.

7. A vehicle projection system, comprising:

the vehicle projection control device according to claim 1; and the projection unit.

8. A vehicle projection control method, comprising:

detecting an occupant on a vehicle;

acquiring traveling information of the vehicle and information indicating that the vehicle is traveling;

causing, when the occupant has been detected and the information indicating that the vehicle is traveling has been acquired, a projection unit to project the acquired traveling information, the projection unit being configured to project a video in a direction towards a body of the occupant on the vehicle; and detecting a head of the occupant on the vehicle in a projection direction of the projection unit, wherein the causing the projection unit to project the acquired traveling information includes changing a projection location of the acquired traveling information based on a location of the detected head.

9. A non-transitory computer-readable storage medium storing a computer program causing a computer to execute:

detecting an occupant on a vehicle;

acquiring traveling information of the vehicle and information indicating that the vehicle is traveling;

causing, when the occupant has been detected and the information indicating that the vehicle is traveling has been acquired, a projection unit to project the acquired traveling information, the projection unit being configured to project a video in a direction towards a body of the occupant on the vehicle; and detecting a head of the occupant on the vehicle in a projection direction of the projection unit, wherein the causing the projection unit to project the acquired traveling information includes changing a projection location of the acquired traveling information based on a location of the detected head.

* * * * *